US012776455B2

(12) United States Patent
Cesarz et al.

(10) Patent No.: US 12,776,455 B2
(45) Date of Patent: Oct. 27, 2026

(54) ELECTRICAL CONTACT AND METHOD OF DESIGNING AN ELECTRICAL CONTACT

(71) Applicant: ABB Schweiz AG, Baden (CH)

(72) Inventors: Bartlomiej Cesarz, Pultusk (PL); Zbigniew Domurad, Tobolice (PL); Piotr Liszewski, Przasnysz (PL); Piotr Piekarski, Cegielnia Lewicka (PL)

(73) Assignee: ABB Schweiz AG, Baden (CH)

( * ) Notice: Subject to any disclaimer, the term of this patent is extended or adjusted under 35 U.S.C. 154(b) by 238 days.

(21) Appl. No.: 18/505,658

(22) Filed: Nov. 9, 2023

(65) Prior Publication Data

US 2024/0153716 A1 May 9, 2024

(30) Foreign Application Priority Data

Nov. 9, 2022 (EP) .................................... 22206513

(51) Int. Cl.
*H01H 1/42* (2006.01)
*H01H 11/00* (2006.01)

(52) U.S. Cl.
CPC .............. *H01H 1/42* (2013.01); *H01H 11/00* (2013.01)

(58) Field of Classification Search
CPC .......... H01H 1/42; H01H 11/00; H01H 13/78; H01H 13/79; H01H 13/80; H01H 13/82; H01H 21/54; H01H 21/56; H01H 9/38; H01H 9/383; H01H 33/12
See application file for complete search history.

(56) References Cited

U.S. PATENT DOCUMENTS

| | | | |
|---|---|---|---|
| 3,787,651 | A | 1/1974 | Chabala et al. |
| 2020/0168412 | A1 | 5/2020 | Yuan et al. |

FOREIGN PATENT DOCUMENTS

| | | | |
|---|---|---|---|
| DE | 1009697 | B | 6/1957 |
| DE | 1064590 | B | 9/1959 |
| DE | 2525082 | A1 | 12/1975 |

OTHER PUBLICATIONS

European Patent Office, Extended European Search Report in European Patent Application No. 22206513.8, 7 pp. (Apr. 25, 2023).

*Primary Examiner* — Anthony R Jimenez
(74) *Attorney, Agent, or Firm* — Fitch Even Tabin & Flannery LLP

(57) ABSTRACT

An electrical contact includes a knife having a first portion, a second portion, and a fixed contact. The fixed contact comprises a galvanic contact point and an arc ignition point. The knife is configured to operate in a first position, where the knife insulated from the fixed contact; a second position, wherein the closest distance between the knife and the fixed contact is between the first portion and the arc ignition point to form an electrical arc between the first portion of the knife and the arc ignition point; a third position, wherein the closest distance between the knife and the fixed contact is between the second portion of the knife and the galvanic contact point; and a fourth position, where the knife and the fixed contact are electrically coupled, namely the second portion of the knife and the galvanic contact point are electrically coupled.

20 Claims, 5 Drawing Sheets

ELECTRICAL CONTACT AND METHOD OF DESIGNING AN ELECTRICAL CONTACT

CROSS-REFERENCE TO RELATED APPLICATIONS

The instant application claims priority to European Patent Application No. 22206513.8, filed Nov. 9, 2022, which is incorporated herein in its entirety by reference.

FIELD OF THE DISCLOSURE

The present disclosure relates to medium and high voltage fuses and switches for use in power networks, transformers, capacitor banks or motors.

BACKGROUND OF THE INVENTION

Nowadays, NAL/NALF/Versa Rupter switches are the most commonly used. NAL, Versa Rupter and NALF switches are gas blow-out switches. Switches of this type are designed in accordance with the standards IEC 62271-1, IEC 62271-102, IEC 62271-103, IEC 62271-105, CSA Standard No. C22.2 and ANSI C37.20.4. They are equipped with a double arc extinguishing system, in which when the current is interrupted, the arc is exposed to a current-independent air blast that automatically starts during the disconnection process. The air blast starts simultaneously with the movement of the contact. Further, a current-dependent blast of gas, which occurs when the walls of an arc nozzle are exposed to a hot arc. During this process, large amounts of gas are released, and the arc is cooled. The concentration of the resulting gas increases with increasing current.

This solution is characterized by a clear disadvantage, i.e., the possible appearance of an electric arc at the point of galvanic contact between the main arc and the fixed contact, when these elements come into contact, the two elements may become welded together, often without breaking the contact. This method requires a quick closing process and the execution of the electrical contacts from durable materials that allow the splitting of the weld when the knife connects to galvanic contact.

BRIEF SUMMARY OF THE INVENTION

The present disclosure describes a switch disconnector allowing the reduction and control of the location where an electric arc occurs. Providing an appropriate place for the generation of an electric arc and its appropriate extinguishing prevents electric welding of the switch disconnector, which could lead to the hazardous situation for the operator and could cause possible damage to the disconnected device. The present disclosure, therefore, describes a system that prevents the welding of contact elements, increasing the safety of the system operators, the switch disconnector system, and enhances the reliability of the system.

According to a first aspect, the disclosure describes an electrical contact, which is suitable for use as a medium-voltage switch disconnector. It comprises a knife, comprising a first portion and a second portion, and a fixed contact. The fixed contact comprises a galvanic contact point, and an arc ignition point. The electrical contact is characterized in that the knife is configured to take one of following positions: a first position, where the knife is in such distance from the fixed contact, that an air act as an electrical insulator; a second position, wherein the closest distance between the knife and the fixed contact is between the first portion of the knife and the arc ignition point and wherein the closest distance allows to form an electrical arc between the first portion of the knife and the arc ignition point; a third position, wherein the closest distance between the knife and the fixed contact is between the second portion of the knife and the galvanic contact point; a fourth position, where the knife and the fixed contact are electrically coupled, namely the second portion of the knife and the galvanic contact point are electrically coupled.

BRIEF DESCRIPTION OF THE SEVERAL VIEWS OF THE DRAWING(S)

DETAILED DESCRIPTION OF THE INVENTION

Figure 1:
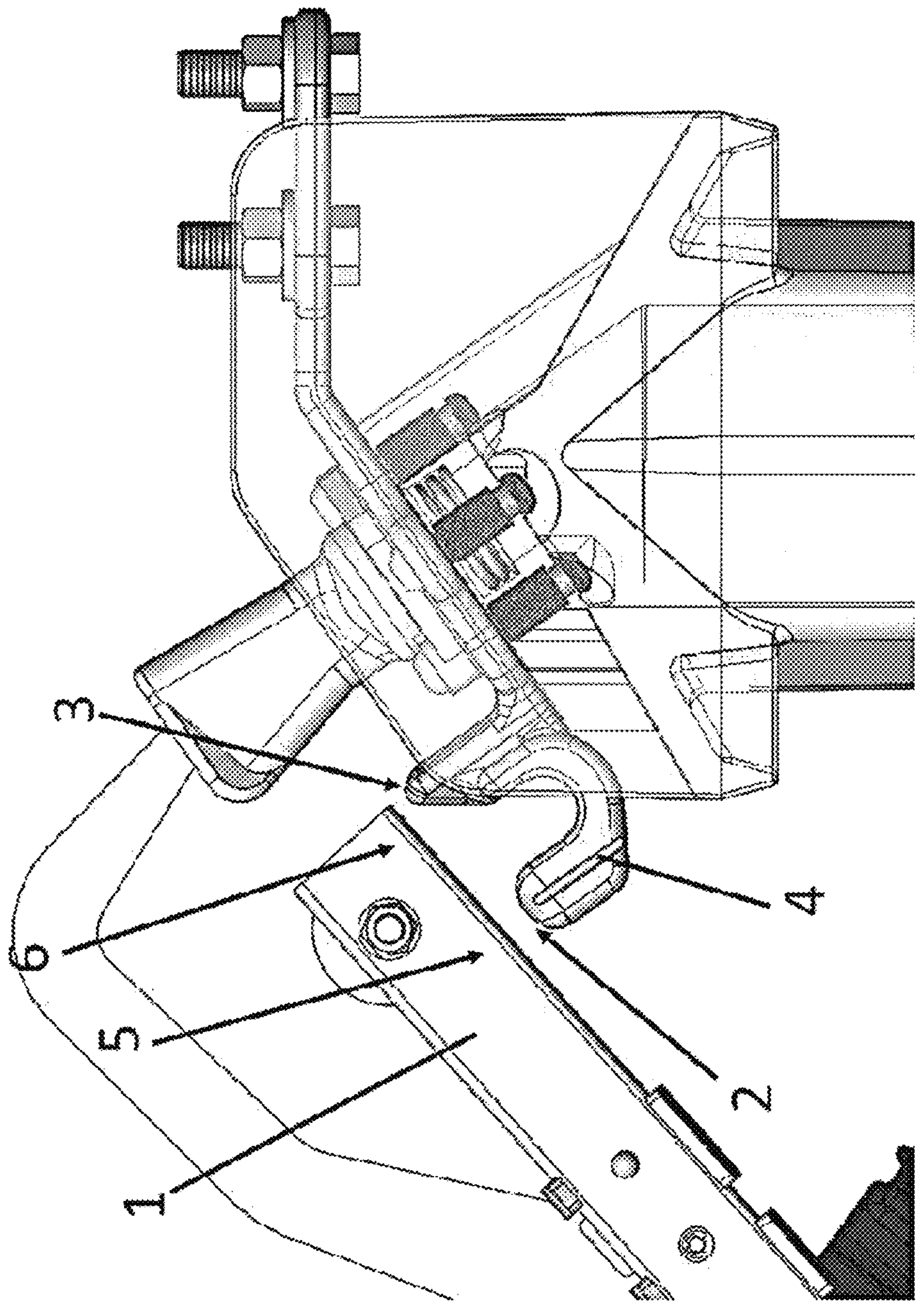
FIG. 1 is a side view of a switch disconnector in accordance with the disclosure.
Figure 2:
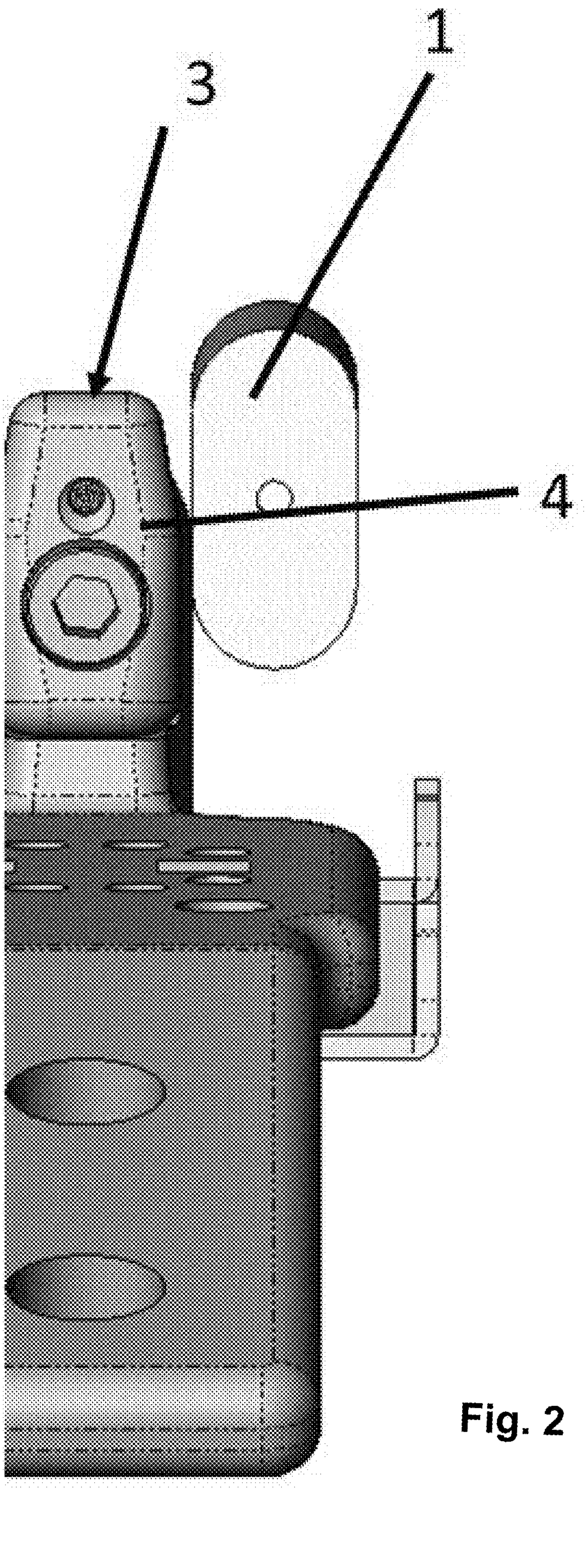
FIG. 2 is a front view of the switch disconnector of FIG. 1.
Figure 3:
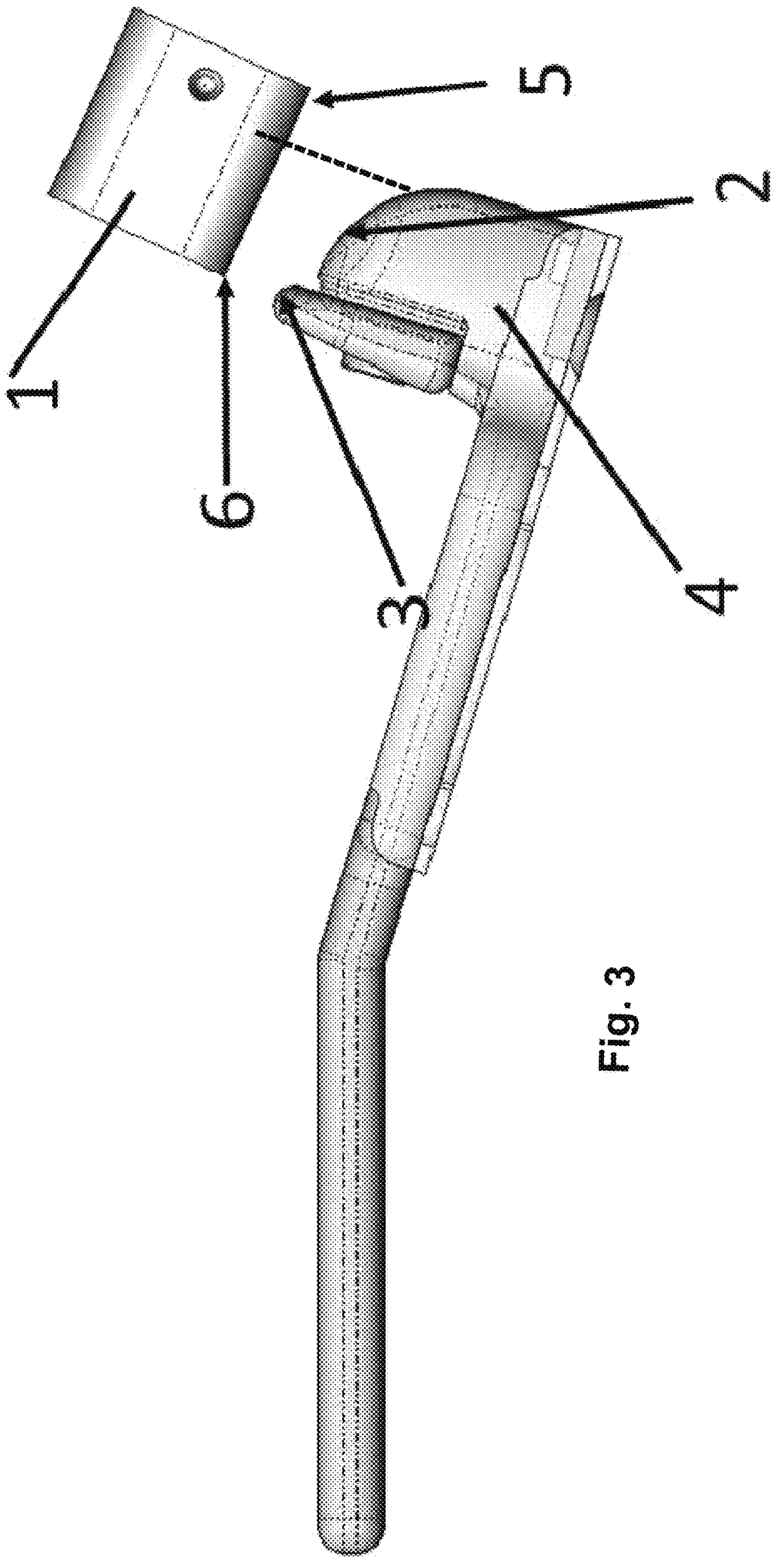
FIG. 3 is a side view of a first embodiment of a switch disconnector in accordance with the disclosure.
Figure 4:
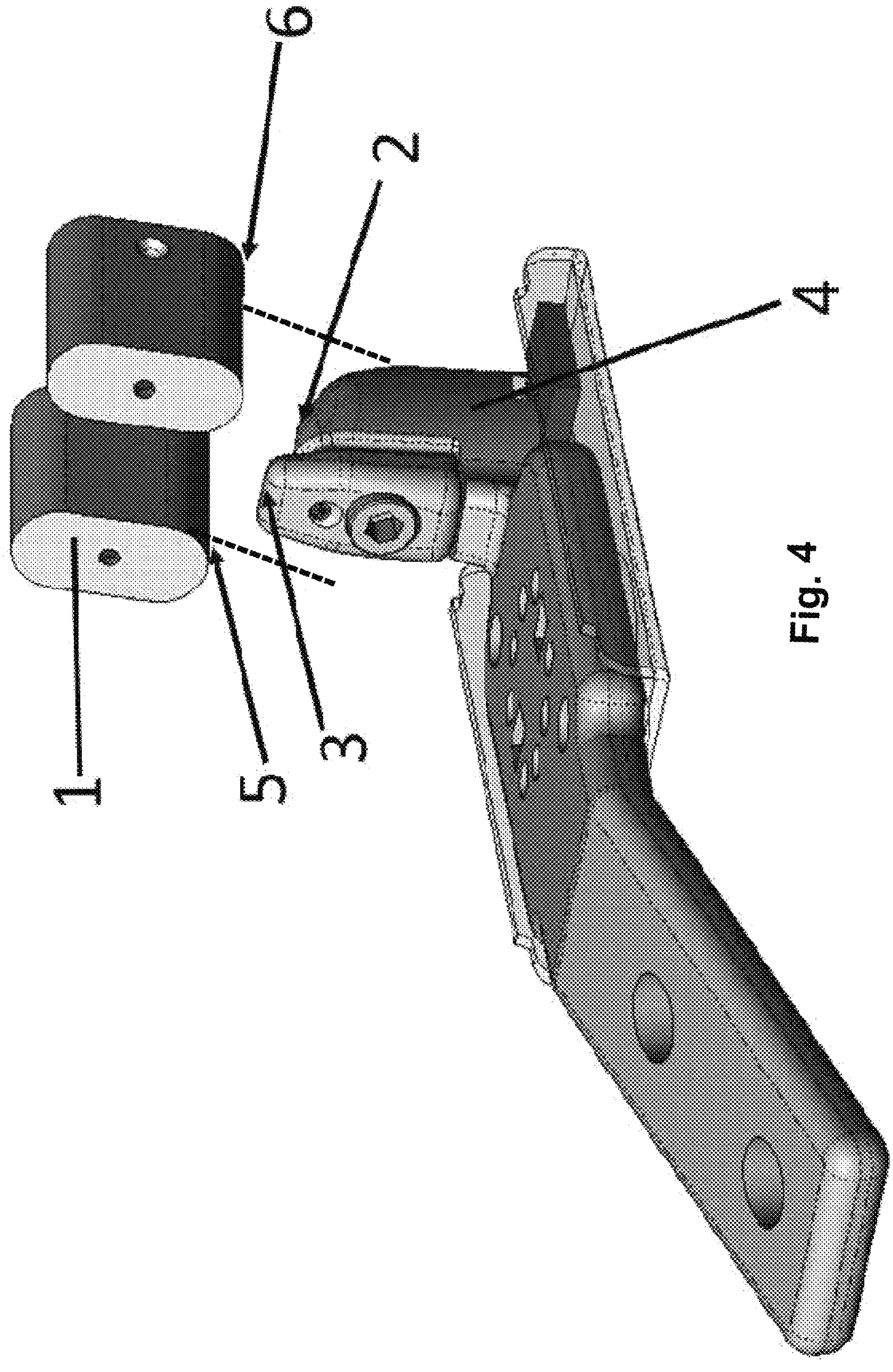
FIG. 4 is an axonometric view of the first embodiment of the switch disconnector shown in FIG. 4.

The present disclosure relates to an electric contact and a method of designing such electric contact allowing for the reduction of the time during which the electric arc is between the galvanic contact point 2 and the main knife 1, reducing the chances of the main knife 1 and galvanic contact point 2 welding together.

Due to unpredictable nature of electrical arc which depends on multiple factors that are hard to describe by mathematical formulas, the design is based mostly on empirical tests and experience.

The performed tests were done in indoor conditions for the phase voltage Up for which the apparatus was designed. Depending on the different rated Line voltages of the switch $U_r$, correspondingly different phase voltages $U_{ph}$ were considered for the test where:

$$U_{ph} = \frac{U_r}{\sqrt{3}}$$

For the electric contact to meet the assumptions, the knife 1 is initially placed in such a distance from the fixed contact 4 that an air act as an electrical insulator. In the second position, the closest distance between the knife 1 and the fixed contact 4 is between the first portion 5 of the knife 1 and the arc ignition point 3 and specific distance allows to form an electrical arc between the first portion 5 of the knife 1 and the arc ignition point 3. The time of occurrence of an electric arc while closing the switch disconnector at a given speed is calculated.

Based on this data, the exact distance between the knife 1 and the arc ignition point 3 is calculated. The fixed contact 4 of the electrical contact is designed to include two teeth, the first tooth, for example closer to the center of the electrical contact, has an arc ignition point 3, and the second tooth, for example, in the front part of the electrical contact, has a galvanic contact point 2. By calculating the distance in time between the knife 1 and the arc ignition point 3 when closing the electric switch disconnector, it is possible to design the first and second tooth shape in such a way that the electric arc always appears at one arc ignition point 3 and cannot move to the point of mechanical contact for at least 80% of the closing distance, which could cause unwanted welding of the main knife 1 to the galvanic contact point 2. Only in the last phase of closing the switch disconnector does the electric arc shift from the arc ignition point 3 to the galvanic contact point 2, and the shortened time of this arc appearance significantly reduces the chance of the main knife 1 and galvanic contact welding.

The knife 1 of electrical contact that has been design according to this method may be placed in number of positions by moving pivotally between:

a. a first position, where the knife 1 is in such distance from the fixed contact 4 that an air act as an electrical insulator;
b. a second position, wherein the closest distance between the knife 1 and the fixed contact 4 is between the first portion 5 of the knife 1 and the arc ignition point 3 and wherein the closest distance allows to form an electrical arc between first portion 5 of the knife 1 and the arc ignition point 3, wherein the arc ignition point 3 is located at the first tooth of the fixed contact 4;
c. a third position, wherein the closest distance between the knife 1 and the fixed contact is between the second portion 6 of the knife 1 and the galvanic contact point 2, wherein the galvanic contact point is located at the second tooth of the fixed contact 4; and
d. a fourth position, where the knife 1 and the fixed contact are electrically coupled, namely the second portion 6 of the knife 1 and the galvanic contact point 2.

According to the first embodiment, as shown on FIG. 1, the electrical contact element is substantially flat, about 1 cm thick, about 30 cm long and about 7.5 cm wide. The electrical contact comprising a knife 1 and a fixed contact 4. The fixed contact 4 being located at one end of the electrical contact element and comprises a galvanic contact point 2 and an arc ignition point 3. In this embodiment there are two first teeth with two separate arc ignition points 3. In this example the first teeth form a V-shape wherein, in the fourth position, the knife 1 is placed between the first teeth. It should be noted that one first tooth, or more first teeth, may be used.

The central part of the element includes holes arranged in a circle for mounting the air or gas blowing part and a second set of holes for mounting the element to the switch disconnector. The middle part is about 7.5 cm wide and 10 cm long and has a 2.5 cm indentation towards the back of the element and the fixed contact 4. The rear part of the element is inclined at an angle of 35 degrees to the plane of the middle part of the element and includes additional mounting holes. The front portion of the member includes a fixed contact 4 that includes a first and a second tooth. In the first example the fixed contact 4 is manufactured as two separate parts, first part comprising of arc ignition point 3 and the second part comprising of galvanic contact point 2, which may be screwed or welded together The first tooth is designed according to the method described above such that for 80% more preferably 90% of the switch disconnector closing distance, the ignition point is at the first tooth. The second tooth is shorter than the first tooth and has been designed such that the electric arc and arc ignition point 3 when closing the switch disconnector appears 20% and more preferably 10% of the distance on the second tooth preventing possible welding of the switch disconnector main knife 1 and the galvanic contact point 2.

In addition, the first tooth has a width smaller than the width between the disconnector knife 1, and the second tooth has a width greater than the width between the switch disconnector's main s knife 1, which means that there is never any contact between the first tooth and the knife 1 and the welding of these elements is not possible. Additionally, the first tooth of fixed contact 4 that comprises the arc ignition point 3 has a sharpened corners which facilitate the arc ignition, protruding the upper contact line which facilitates arc ignition during switch disconnector closing. The galvanic contact point 2 is rounded to prevent premature initiation of arc but is designed to protrude above the galvanic contact point 2 of the second teeth to be sure that the arc will appear first at arc ignition point 3 due to closest distance.

Figure 5:
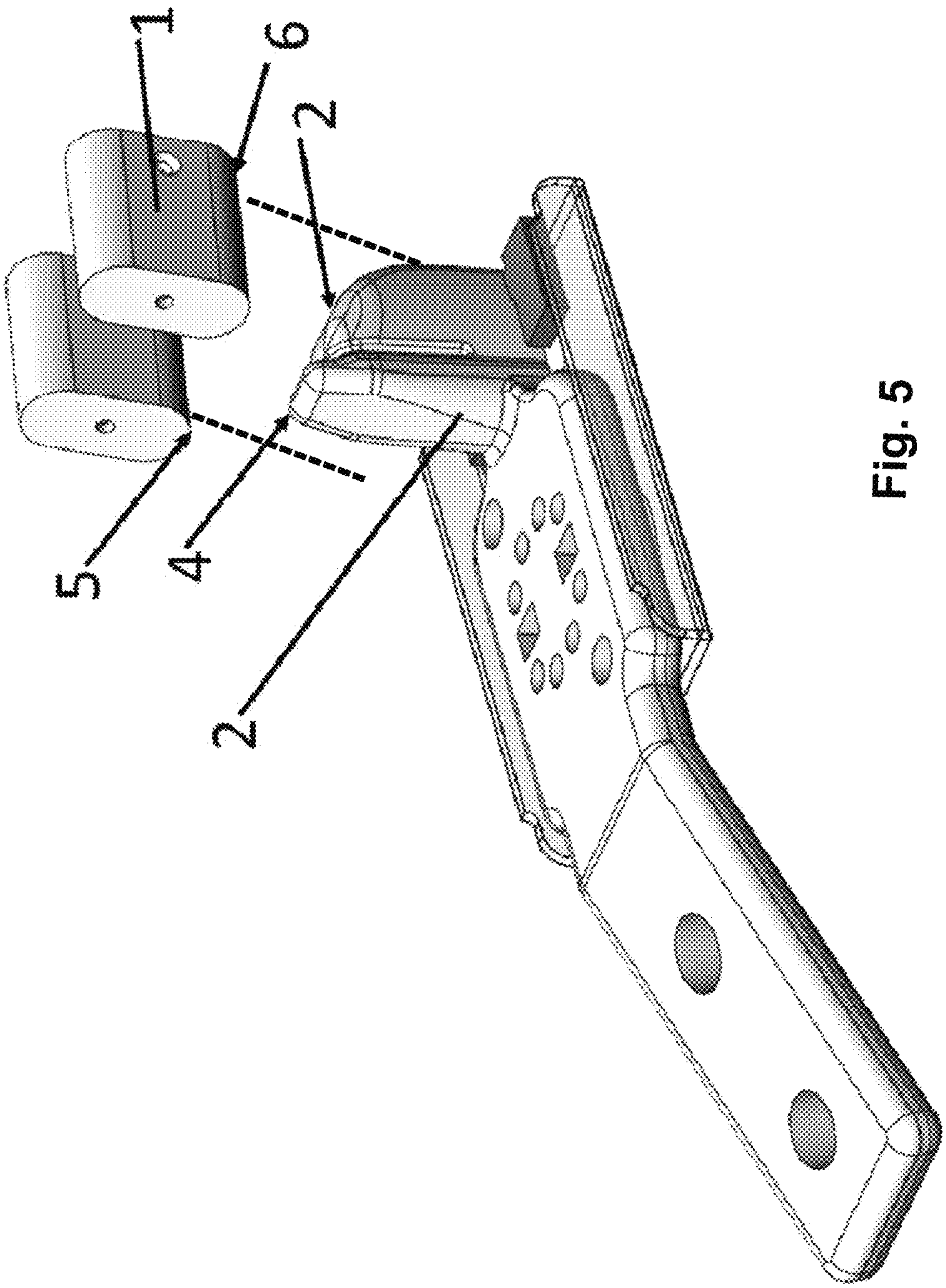
FIG. 5 is an axonometric view of a second embodiment of a switch disconnector in accordance with the disclosure.

As it is shown on FIGS. 1 and 5, it is possible that both the first and the second tooth are formed during the formation of the fixed contact and are not manufactured as additional elements and are forming a single part.

According to the second embodiment, as shown on FIG. 2-5, it is possible to form a fixed contact that has two galvanic contact points 2 preferably each located at parallel to each other teeth.

The switch disconnector element is made of a conductive material, for example copper type CuETP, with a hardness of at least 35 HB. Preferably, it is additionally covered with a silver passivation coating, The electric contact and the method of designing such contact increases the reliability and safety of the process of closing the electric circuit, does not require quality control of the contact surface, does not require additional electrical or mechanical systems that would prevent the appearance of an electric arc, such as the use of additional knives, and the only change required is to modify the shape of the electrical contact which comes into contact with the main knife 1.

LIST OF REFERENCE NUMERALS

1—knife
2—galvanic contact point
3—arc ignition point
4—fixed contact
5—first portion
6—second portion According a first embodiment, an electrical contact, suitable for medium-voltage switch disconnector is provided. It comprises a knife, comprising a first portion and a second portion, and a fixed contact. The fixed contact comprises a galvanic contact point, and an arc ignition point. The electrical contact is characterized in that the knife is configured to take one of following positions: a first position, where the knife is in such distance from the fixed contact, that an air act as an electrical insulator; a second position, wherein the closest distance between the knife and the fixed contact is between the first portion of the knife and the arc ignition point and wherein the closest distance allows to form an electrical arc between the first portion of the knife and the arc ignition point; a third position, wherein the closest distance between the knife and the fixed contact is between the second portion of the knife and the galvanic contact point; a fourth position, where the knife and the fixed contact are electrically coupled, namely the second portion of the knife and the galvanic contact point are electrically coupled.

According to one of the preferable embodiments the fixed contact comprises two separate parts, first part comprising arc ignition point and second part comprising galvanic contact point.

According to one of the preferable embodiments the fixed contact is manufactured as one part comprising arc ignition point and galvanic contact point.

According to one of the preferable embodiments the electrical contact is configured to move pivotally.

According to another of the preferable embodiments the electrical contact is characterized in that the fixed contact comprises two galvanic contact points.

According to further preferable embodiments the arc ignition point is sharpened, and the galvanic contact point is rounded.

According to further preferable embodiments the electrical contact comprises two knives and wherein the galvanic contact point and the arc ignition point are equally distanced from each knife.

According to further preferable embodiments the knife and the fixed contact are made of CuETP.

According to further preferable embodiments a part of the fixed contact with the arc ignition point is detachable from the fixed contact.

According to second preferable embodiment a method of designing an electrical contact is provided, comprising:

- determining the moment of electric arc formation when a knife transition from a first position to a fourth position;
- calculation of the distance between the knife and the arc ignition point while the knife is in a second position; and
- adjusting the length of parts of fixed contact comprising a galvanic contact point and the arc ignition point such, that the first tooth including the ignition point and the second tooth containing the galvanic contact so that the electric arc remains on the arc ignition point for longer time than on the galvanic contact point.

According to one of the preferable embodiments electrical contact designed according to the method may be used in a medium-voltage apparatus.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrical contact, comprising:

a knife comprising a first portion and a second portion; and a fixed contact, the fixed contact comprising:

- a galvanic contact point, and
- an arc ignition point,
- wherein the knife is operable between:
- a first position, where the knife is spaced from the fixed contact such that air acts as an electrical insulator;
- a second position, wherein a closest distance between the knife and the fixed contact is between the first portion of the knife and the arc ignition point, and wherein the closest distance allows an electrical arc to form between the first portion of the knife and the arc ignition point without physical contact;
- a third position, wherein the closest distance between the knife and the fixed contact is between the second portion of the knife and the galvanic contact point; and
- a fourth position, where the knife and the fixed contact are electrically coupled.

2. The electrical contact according to claim 1, wherein in the fourth position, the second portion of the knife and the galvanic contact point are electrically coupled.

3. The electrical contact according to claim 1, wherein the knife is configured to move pivotally relative to the fixed contact.

4. The electrical contact according to claim 1, wherein the fixed contact comprises two galvanic contact points.

5. The electrical contact according to claim 1, wherein the fixed contact comprises a first part and a second part, wherein the first part comprises the arc ignition point and the second part comprises the galvanic contact point.

6. The electrical contact according to claim 1, wherein the arc ignition point and the galvanic contact point of the fixed contact form a single part.

7. The electrical contact according to claim 1, wherein the arc ignition point is sharpened, and wherein the galvanic contact point is rounded.

8. The electrical contact according to claim 1, further comprising a second knife, wherein the galvanic contact point and the arc ignition point are equally distanced from each of the knife and the second knife.

9. The electrical contact according to claim 1, wherein the knife and the fixed contact are made of copper electrolytic tough pitch (CuETP).

10. The electrical contact according to claim 1, wherein a part of the fixed contact with the arc ignition point is detachable from the fixed contact.

11. A method of designing an electrical contact, the electrical contact comprising:

a knife comprising a first portion and a second portion; and a fixed contact, the fixed contact comprising:

a galvanic contact point, and an arc ignition point, wherein the knife is operable between:

a first position, where the knife is spaced from the fixed contact such that air acts as an electrical insulator;

a second position, wherein a closest distance between the knife and the fixed contact is between the first portion of the knife and the arc ignition point, and wherein the closest distance allows an electrical arc to form between the first portion of the knife and the arc ignition point without physical contact;

a third position, wherein the closest distance between the knife and the fixed contact is between the second portion of the knife and the galvanic contact point; and a fourth position, where the knife and the fixed contact are electrically coupled;

wherein the method comprises:

determining a moment of electric arc formation when a knife transitions from the first position to the fourth position;

calculating a distance between the knife and the arc ignition point while the knife is in the second position; and adjusting a length of parts of the fixed contact comprising a galvanic contact point and the arc ignition point so that a first tooth including the ignition point and a second tooth containing the galvanic contact, so that the electric arc remains on the arc ignition point longer than on the galvanic contact point.

12. The method according to claim 11, wherein in the fourth position, the second portion of the knife and the galvanic contact point are electrically coupled.

13. The method according to claim 11, wherein the knife is configured to move pivotally relative to the fixed contact.

14. The method according to claim 11, wherein the fixed contact comprises two galvanic contact points.

15. The method according to claim 11, wherein the fixed contact comprises a first part and a second part, wherein the first part comprises the arc ignition point and the second part comprises the galvanic contact point.

16. The method according to claim 11, wherein the arc ignition point and the galvanic contact point of the fixed contact form a single part.

17. The method according to claim 11, wherein the arc ignition point is sharpened, and wherein the galvanic contact point is rounded.

18. The method according to claim 11, further comprising a second knife, wherein the galvanic contact point and the arc ignition point are equally distanced from each of the knife and the second knife.

19. The method according to claim 11, wherein the knife and the fixed contact are made of copper-electrolytic tough pitch (CuETP).

20. The method according to claim 11, wherein a part of the fixed contact with the arc ignition point is detachable from the fixed contact.

* * * * *